Patented July 16, 1946

2,404,198

UNITED STATES PATENT OFFICE 2,404,198

DISAZO AND POLYAZO BENZIDINE TYPE DYESTUFFS

Fritz Straub, Kaiseraugst, near Basel, and Jakob Brassel, Basel, Switzerland, assignors to Society of Chemical Industry in Basle, Basel, Switzerland, a Swiss firm No Drawing. Application August 23, 1943, Serial No. 499,707. In Switzerland September 3, 1942

15 Claims. (Cl. 260—159)

The present invention is concerned with disazo and polyazo dyestuffs, more particularly those of the direct dyeing (i. e. substantive) series. Still more particularly it is an object of the present invention to provide new dyestuffs capable of forming complex metal compounds, especially such dyestuffs of the said series, the complex metal compounds of which are substantially insoluble in normal baths used for textile treatments, whereas the parent dyestuffs free from complex bound metal are perfectly soluble and can be dyed in the usual way. There is a strong demand for such dyestuffs, especially since the simple and effective dyeing method of U. S. Patent 2,148,659 (cf. also French Patent 809,893) has become known. Especially dyestuffs dyeing red shades, such as are obtainable according to the present invention, are highly valued. Prior to this invention, numerous dyestuffs derived from benzidine and dianisidine have become known. Due to the lack of complex-forming groups in ortho-position to the azo-groups in the benzidine dyestuffs, these are not capable of forming complex metal compounds unless coupling components are used which are by themselves (i. e. without the aid of a complex forming group in the diazo component) capable of forming complex metal compounds, such as salicylic acid or ortho: ortho'-dihydroxy-azo-dyestuffs capable of coupling, etc. Thereby the choice of coupling components is obviously very restricted. The methoxy groups in ortho-position to the azo groups in the dianisidine dyestuffs act, it is true, as complex forming groups, but the complex metal compounds obtained with these dyestuffs are rather unstable and often do not withstand even mild soaping.

Furthermore, it is well known in the art that many valuable acid wool dyestuffs are obtained with coupling components of the pyrazolone series. As far as we are aware, nothing was known prior to the present invention which would indicate a beneficial effect to be expected in using pyrazolone coupling components in the manufacture of substantive azo dyestuffs of the said kind.

It has been found that valuable disazo and polyazo dyestuffs may be obtained by coupling tetrazo compounds with azo components, if desired by using further coupling or connecting reactions, if as a tetrazo compound tetrazotized 3-hydroxy-4:4'-diaminodiphenyl, and as at least one azo component a pyrazolone are used and, if desired, causing agents yielding metal to react with the dyestuffs thus obtained.

The tetrazotization of the 3-hydroxybenzidine may be conducted in known manner, for instance in a hydrochloric acid solution.

For the coupling with the tetrazotized 3-hydroxy-benzidine there may be used two molecular proportions of the same or different coupling components of which, however, at least one must be a pyrazolone.

Further azo components to be united with the tetrazotized 3-hydroxybenzidine may belong, for instance, to the benzene or naphthalene series, possess a heterocyclic system, or contain a carbon atom capable of coupling in an open chain. There may for instance be mentioned phenols and particularly salicylic acids, resorcinol, naphthols, naphthol-mono- and -disulfonic acids, aminonaphthols and the sulfonic acids thereof. Among the pyrazolones there come particularly into consideration such products which are substituted in known manner, for instance, by an aryl radical in 1-position and/or by a methyl or carboxyl group in 3-position. In this case also the aryl nucleus, for example the benzene nucleus, may carry substituents such as for example a sulfamide, nitro or amino group, as well as the salicylic acid grouping.

Particularly valuable dyestuffs are in many cases obtained if as at least one azo component such a component is used which contains the salicylic acid grouping. This grouping may also be present in the pyrazolones, such as in the case of 1-(3'-carboxy-4'-hydroxyphenyl)-3-methyl-5-pyrazolone.

In this manner a great number of very valuable disazo dyestuffs may be obtained according to the present invention. For the production of trisazo and polyazo dyestuffs there are advantageously used azo components which contain an amino group capable of further diazotization or a substituent convertible into such a group. Further also such azo components may be used which are capable of repeated coupling, or also such components which lend themselves to other connecting reactions leading to the synthesis of polyazo dyestuffs, such as urea formation, reductive connection of two nitro groups, etc. As examples there are mentioned 1-(3'-aminophenyl)-3-methyl-5-pyrazolone, 2-amino-5-hydroxynaphthalene-7-sulfonic acid, resorcinol and 5:5'-dihydroxy-2:2'-dinaphthylamino-7:7'-disulfonic acid. The dyestuffs thus obtained may then be converted in known manner into trisazo or polyago dyestuffs. Furthermore, trisazo and polyazo dyestuffs are of course obtained by using coupling components containing azo groups in at least one place, for example azo dyestuffs containing a carbon atom capable of coupling in a benzene ring (such as mono-coupled resorcinol dyestuffs) or in a naphthalene ring (such as azo dyestuffs from any diazo compounds and amino-naphtholsulfonic acids coupled in an acid medium), etc.

It is to be remarked that the two diazonium groups in tetrazotized 3-hydroxy-4:4'-diaminodiphenyl possess a rather different coupling energy, in that the 4'-diazonium group couples first and the 4-diazonium group (in ortho position to the 3-hydroxyl group) afterwards. Therefore it is well possible, and in many instances preferable, to unite the said tetrazo compounds with two different coupling components. Thus, the first component may be selected to contain a grouping capable of forming complex metal compounds by itself, whereas the second coupling component brings about a complex forming group by a simple coupling in ortho-position to a hydroxyl group, in view of the hydroxyl group standing in ortho position to the diazonium group in the diazo component.

The dyestuffs obtained according to the present invention are suitable for dyeing and printing the most various animal and particularly cellulosic fibers, such as wool, silk, leather, and especially cotton, linen, rayon, and staple fibers from regenerated cellulose. Very valuable red shades, among other shades, are also obtained.

Favorable results are obtained if agents yielding metal, particularly agents yielding copper, are caused to react with the dyestuffs obtained, which reaction may be performed in substance, in the dyeing bath, or on the fiber. If the dyestuff, for instance due to the presence of two or more groups lending solubility to the dyestuffs, particularly sulfonic acid groups, is constituted in such a manner that also its complex metal compounds produced in substance, for instance complex copper compounds, are soluble, the latter may be produced in known manner and used for dyeing. Dyeings of particularly good fastness to wet treatments are obtained in many instances with such dyestuffs, obtainable according to the present invention, whose complex metal compounds are sparingly soluble to insoluble. If use is made of such dyestuffs it is of advantage to work for example according to the known after-coppering process, or more simply according to the dyeing process known for example from the U. S. Patent No. 2,148,659 (see also French Patent No. 809,893) according to which dyeing is conducted in the same bath as the after-treatment with agents yielding metal, particularly agents yielding copper. Such agents yielding copper mainly come into consideration which are stable towards alkalies, such as complex copper tartrates.

The following examples illustrate the invention, the parts being by weight:

*Example 1*

5.0 parts of 3-hydroxybenzidine are tetrazotized with sodium nitrite in the usual manner and in the presence of hydrochloric acid. The solution of the tetrazo compound is mixed at 5° C. with a solution of 3.5 parts of salicylic acid and 6 parts of sodium hydroxide in 40 parts of water, and the mixture is stirred for ½ hour at 4–6° C. After this time the monoazo-dyestuff is formed. A solution of 5.85 parts of 1-(4'-hydroxy-3'-carboxyphenyl)-3-methyl-5-pyrazolone and 2 parts of sodium hydroxide in 50 parts of water are now added to the coupling mixture. The mixture is stirred for 1 hour at 10–12° C. and for 20 hours at 15–20° C. The dyestuff is precipitated by the addition of common salt. When dry, it is a dark powder of the formula

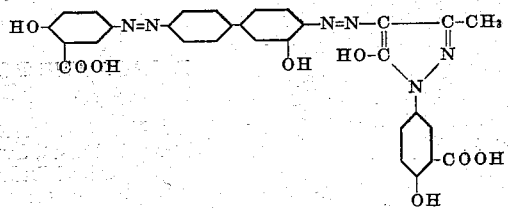

which dissolves in water to an orange-brown, in dilute alkalies to an orange-red and in concentrated sulfuric acid to a ruby-red solution and dyes vegetable fibers red tints which are fast to washing and light on being dyed and coppered according to the one-bath process.

Similar dyestuffs are obtained when replacing the 1-(4'-hydroxy-3'-carboxyphenyl)-3-methyl-5-pyrazolone used in this example, for instance by the equivalent quantity of 1-(3'-nitrophenyl)-3-methyl-5-pyrazolone, 1-(4'-β-hydroxyethoxyphenyl)-3-methyl-5-pyrazolone or 3-methyl-5-pyrazolone.

*Example 2*

5.0 parts of 3-hydroxybenzidine are tetrazotized with sodium nitrite in the usual manner and in the presence of hydrochloric acid. The clear solution of the tetrazo compound is added at 10–15° C. to a solution alkaline with sodium carbonate of 7.73 parts of the dyestuff prepared by coupling 1 mol. of diazotized 2-amino-1-phenol-4-sulfamide with 1 mol. of resorcinol in a medium alkaline with sodium carbonate. The whole is stirred for 1 hour at 10–12° C. and a caustic alkaline solution of 5.85 parts of 1-(4'-hydroxy-3'-carboxyphenyl)-3-methyl-5-pyrazolone is added to the coupling mixture. Stirring is continued for 1 hour at 15–18° C. and coupling is completed by heating the mixture for 20–30 hours to 35–40° C. The trisazo-dyestuff of the formula

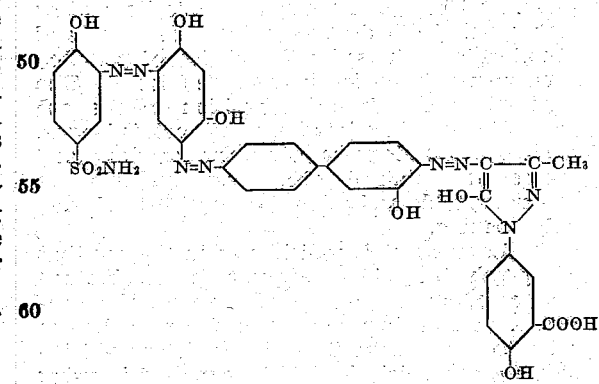

is precipitated by the addition of common salt and hydrochloric acid. When dry, it is a green powder of bronze lustre, which dissolves in water and dilute sodium carbonate solution to a bordeaux red, in dilute caustic alkalies to a brown red and in concentrated hydrochloric acid to a dichroic red-blue solution which dyes vegetable fibers violet brown shades which are fast to washing on being dyed and coppered according to the one bath process.

Similar dyestuffs having the same fastness properties can be obtained by replacing the 2-amino-1-phenol-4-sulfamide used in this example by other ortho-aminophenols, for example by the equivalent quantity of 4-nitro-2-amino-1-phenol.

*Example 3*

5 parts of 3-hydroxybenzidine are tetrazotized with sodium nitrite in usual manner and in the presence of hydrochloric acid. The solution of the tetrazo compound is added at 5° C. to a solution of 3.46 parts of salicylic acid and 6 parts of sodium hydroxide in 40 parts of water. The whole is stirred for ½ hour at 4–6° C., a solution of 4.73 parts of 1-(3'-aminophenyl)-3-methyl-5-pyrazolone and 2 parts of sodium hydroxide in 50 parts of water is added and stirring is continued for 1 hour at 10–12° C. and 20–25 hours at 15–20° C. After neutralizing with hydrochloric acid the disazo-dyestuff is filtered and dissolved by the addition of 1.2 parts of sodium hydroxide in 400 parts of water. 25 parts by volume of N-sodium nitrite solution are added to the dyestuff solution and the mixture is cooled to 5° C. 60 parts by volume of 2N-hydrochloric acid are poured to the solution while stirring well. The temperature is maintained for 15–20 hours at 10–15° C. and the diazodisazo-dyestuff is filtered. This is introduced, in the form of a moist paste, into a solution of 5.85 parts of 1-(4'-hydroxy-3'-carboxyphenyl)-3-methyl-5-pyrazolone and 6 parts of sodium hydroxide in 90 parts of water. Stirring is continued for 1 hour at 10–12° C. and coupling is completed at 18–20° C.

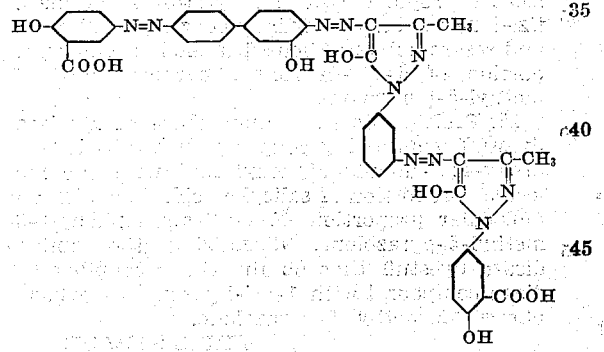

The trisazo-dyestuff of the formula is precipitated and dried. It is a dark powder of metallic lustre which dissolves in water to an orange brown, in dilute alkalies to a red brown and in concentrated sulfuric acid to a bordeaux red solution and dyes vegetable fibers red tints of very good fastness to light and washing on being dyed and coppered according to the one bath process.

*Example 4*

100 parts of cotton are introduced at 50° C. into a dyebath containing in 2500 parts of water 2 parts of sodium carbonate and 1.5 parts of the dyestuff prepared according to Example 1, first paragraph, and the temperature is slowly raised to 90–95° C. 30 parts of Glauber's salt are added after ¼ hour and dyeing is continued at this temperature for a further ¾ hour. The bath is then cooled to about 70° C., the necessary quantity of a solution of complex copper tartrate made feebly alkaline with sodium carbonate is added and the material is coppered at 80–90° C. for ½ hour. It is then thoroughly rinsed and soaped for a short time, if necessary. The cotton is dyed fast red tints.

What we claim is:

1. Azo dyestuffs of the general formula

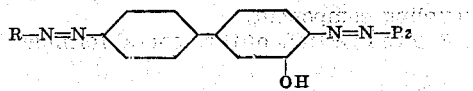

wherein R stands for the radical of a coupling component selected from those belonging to the benzene and naphthalene series and Pz stands for the radical of a pyrazolone coupling component.

2. Azo dyestuffs of the general formula

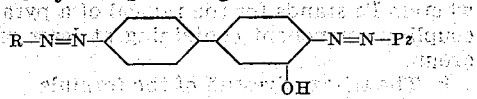

wherein R stands for the radical of a coupling component selected from those belonging to the benzene and naphthalene series, and Pz stands for the radical of a pyrazolone coupling component, at least one of the said coupling components containing a grouping capable of forming complex metal compounds by itself.

3. Azo dyestuffs of the general formula

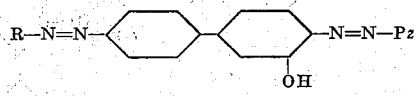

wherein R stands for the radical of a coupling component selected from those belonging to the benzene and naphthalene series, and Pz stands for the radical of a pyrazolone coupling component, at least one of the said coupling components containing a salicyclic acid grouping.

4. Azo dyestuffs of the general formula

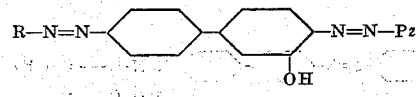

wherein R stands for the radical of a coupling component, selected from those belonging to the benzene and naphthalene series, containing a grouping capable of forming complex metal compounds by itself, and Pz stands for a pyrazolone coupling component.

5. Azo dyestuffs of the general formula

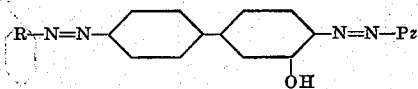

wherein R stands for the radical of a coupling component, selected from those belonging to the benzene and naphthalene series, containing a grouping capable of forming complex metal compounds by itself, and Pz stands for a pyrazolone coupling component also containing a grouping capable of forming complex metal compounds by itself.

6. Azo dyestuffs of the general formula

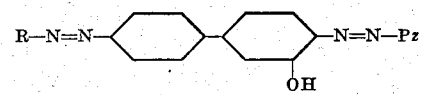

wherein R stands for the radical of a coupling component, selected from those belonging to the benzene and naphthalene series, containing a grouping capable of forming complex metal compounds by itself, Pz stands for the radical of a pyrazolone coupling component, and wherein at least one of the components R and Pz contains at least one azo group.

7. Azo dyestuffs of the general formula

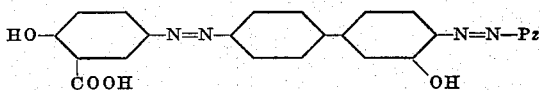

wherein Pz stands for the radical of a pyrazolone coupling component.

8. Azo dyestuffs of the general formula

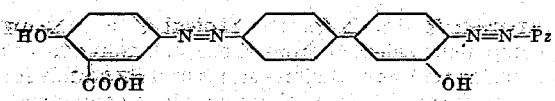

wherein Pz stands for the radical of a pyrazolone coupling component containing at least one azo group.

9. The trisazo dyestuff of the formula

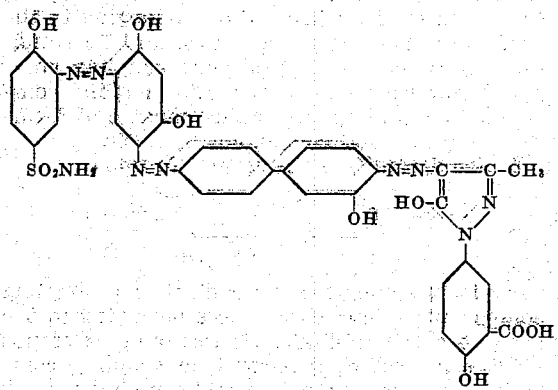

10. The trisazo dyestuff of the formula

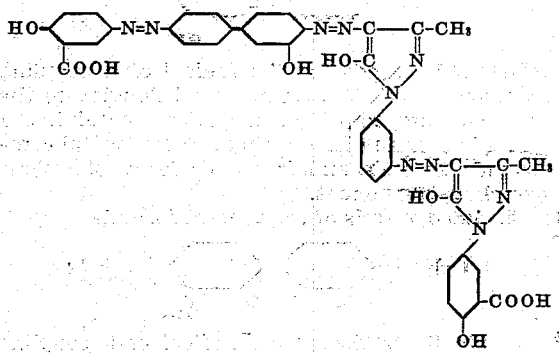

11. The disazo dyestuff of the formula

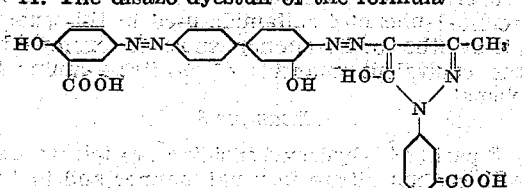

12. Process for the manufacture of azo dyestuffs, comprising coupling tetrazotized 3-hydroxy-4:4'-diaminodiphenyl with two molecular proportions of coupling components, the first of which is selected from the group consisting of coupling components of the benzene and naphthalene series and the second of which is a pyrazolone coupling component, at least one of said coupling components containing a salicylic acid grouping.

13. Process for the manufacture of azo dyestuffs, comprising coupling tetrazotized 3-hydroxy-4:4'-diaminodiphenyl first with one molecular proportion of a coupling component capable of forming complex metal compounds by itself, said coupling component being selected from the group consisting of coupling components of the benzene and naphthalene series, and then with one molecular proportion of a pyrazolone coupling component.

14. Process for the manufacture of a trisazo dyestuff, comprising coupling tetrazotized 3-hydroxy-4:4'-diaminodiphenyl first with one molecular proportion of the dyestuff from diazotized 2-amino-1-hydroxybenzene-4-sulfamide and resorcinol, and then with one molecular proportion of 1-(4'-hydroxy-3'-carboxyphenyl)-3-methyl-5-pyrazolone.

15. Process for the manufacture of a trisazo dyestuff, comprising coupling tetrazotized 3-hydroxy-4:4'-diaminodiphenyl first with one molecular proportion of salicylic acid, then with one molecular proportion of 1-(3'-aminophenyl)-3-methyl-5-pyrazolone, diazotizing the aminodisazo dyestuff thus obtained and coupling the diazo compound with 1-(4'-hydroxy-3'-carboxyphenyl)-3-methyl-5-pyrazolone.

FRITZ STRAUB.
JAKOB BRASSEL.